US008750317B2

(12) United States Patent
Matsumoto et al.

(10) Patent No.: US 8,750,317 B2
(45) Date of Patent: Jun. 10, 2014

(54) MULTIMEDIA DATA MONITORING SYSTEM AND MULTIMEDIA DATA MONITORING METHOD

(75) Inventors: Kouichi Matsumoto, Tokyo (JP); Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 962 days.

(21) Appl. No.: 11/790,201

(22) Filed: Apr. 24, 2007

(65) Prior Publication Data

US 2007/0285205 A1    Dec. 13, 2007

(30) Foreign Application Priority Data

May 11, 2006  (JP) .................................. 2006-132795

(51) Int. Cl.
*H04L 12/28* (2006.01)
*H04J 3/16* (2006.01)
*H04L 12/66* (2006.01)
*H04L 12/26* (2006.01)
*H04L 29/06* (2006.01)

(52) U.S. Cl.
CPC ....... *H04L 12/2618* (2013.01); *H04L 29/06068* (2013.01); *H04L 65/605* (2013.01)
USPC ............................ 370/401; 370/467; 370/356

(58) Field of Classification Search
None
See application file for complete search history.

(56) References Cited

U.S. PATENT DOCUMENTS

| 6,040,867 | A  | * | 3/2000 | Bando et al. | 375/240.27 |
| 6,785,261 | B1 | * | 8/2004 | Schuster et al. | 370/352 |
| 6,967,958 | B2 | * | 11/2005 | Ono et al. | 370/401 |
| 7,231,483 | B2 | * | 6/2007 | Gros et al. | 710/305 |
| 7,548,539 | B2 | * | 6/2009 | Kouretas et al. | 370/356 |
| 2002/0018445 | A1 | | 2/2002 | Kobayashi | |
| 2002/0159645 | A1 | * | 10/2002 | Kobayashi et al. | 382/243 |
| 2003/0079032 | A1 | * | 4/2003 | Orsolits et al. | 709/230 |
| 2004/0003046 | A1 | | 1/2004 | Grabelsky et al. | |
| 2004/0023641 | A1 | | 2/2004 | Tsutsumi et al. | |

(Continued)

FOREIGN PATENT DOCUMENTS

| EP | 1 345 395 A1 | 9/2003 |
| JP | 10-276236 A | 10/1998 |

(Continued)

OTHER PUBLICATIONS

Japanese Office Action dated Sep. 13, 2011 (with a partial English translation).

*Primary Examiner* — Faruk Hamza
*Assistant Examiner* — Cassandra Decker
(74) *Attorney, Agent, or Firm* — McGinn IP Law Group, PLLC

(57) ABSTRACT

An exemplary aspect of the invention is a data monitoring system including a data monitoring apparatus, a monitoring terminal, a first network, a second network, a first communication apparatus that is connected to the first network and a second communication apparatus that is connected to the second network, wherein the data monitoring apparatus includes a call processing circuit to retrieve decoding information out of a call processing signal transmitted from one of the first communication apparatus and the second communication apparatus to the other and to transmit the decoding information to the monitoring terminal, and a data processing circuit to transmit data having voice data or image data to the monitoring terminal, wherein one of the first communication apparatus and the second communication apparatus transmits the data to the other, and wherein the monitoring terminal includes a decoding circuit to decode the data in accordance with the decoding information.

20 Claims, 6 Drawing Sheets

(56) References Cited

U.S. PATENT DOCUMENTS

| | | |
|---|---|---|
| 2004/0037267 A1 | 2/2004 | Bennett et al. |
| 2005/0009519 A1 | 1/2005 | Murai et al. |
| 2005/0036450 A1 | 2/2005 | Arimori et al. |
| 2005/0108764 A1* | 5/2005 | Rosenberg et al. ............ 725/90 |
| 2005/0141610 A1* | 6/2005 | Isu et al. .................. 375/240.12 |
| 2005/0152275 A1 | 7/2005 | Laurila et al. |
| 2007/0053346 A1* | 3/2007 | Bettis et al. ................... 370/352 |
| 2007/0165598 A1* | 7/2007 | Hynonen et al. .............. 370/352 |
| 2008/0014907 A1* | 1/2008 | Chun ......................... 455/414.1 |
| 2008/0218584 A1 | 9/2008 | Matsumoto et al. |
| 2009/0003227 A1* | 1/2009 | Malomsoky et al. ......... 370/252 |

FOREIGN PATENT DOCUMENTS

| | | |
|---|---|---|
| JP | 2002-026976 A | 1/2002 |
| JP | 2003-284144 A | 10/2003 |
| JP | 2004-222009 | 8/2004 |
| JP | 2004-222009 A | 8/2004 |
| JP | 2005-033664 A | 2/2005 |
| JP | 2005-514808 A | 5/2005 |
| JP | 2005-348163 | 12/2005 |
| JP | 2005-348163 A | 12/2005 |
| WO | WO 2005/025133 A1 | 3/2005 |
| WO | WO 2005/094077 A1 | 10/2005 |

\* cited by examiner

FIG. 3

INFORMATION TABLE

| CHANNEL NUMBER | MULTIPLEXING TABLE | 3G-324M TERMINAL CONFIG INFORMATION | SIP TERMINAL CONFIG INFORMATION |
|---|---|---|---|
| 00ch | LONO····<br>···· | 000001B0080···· | 000001B0040···· |
| 01ch | ···· | ···· | |

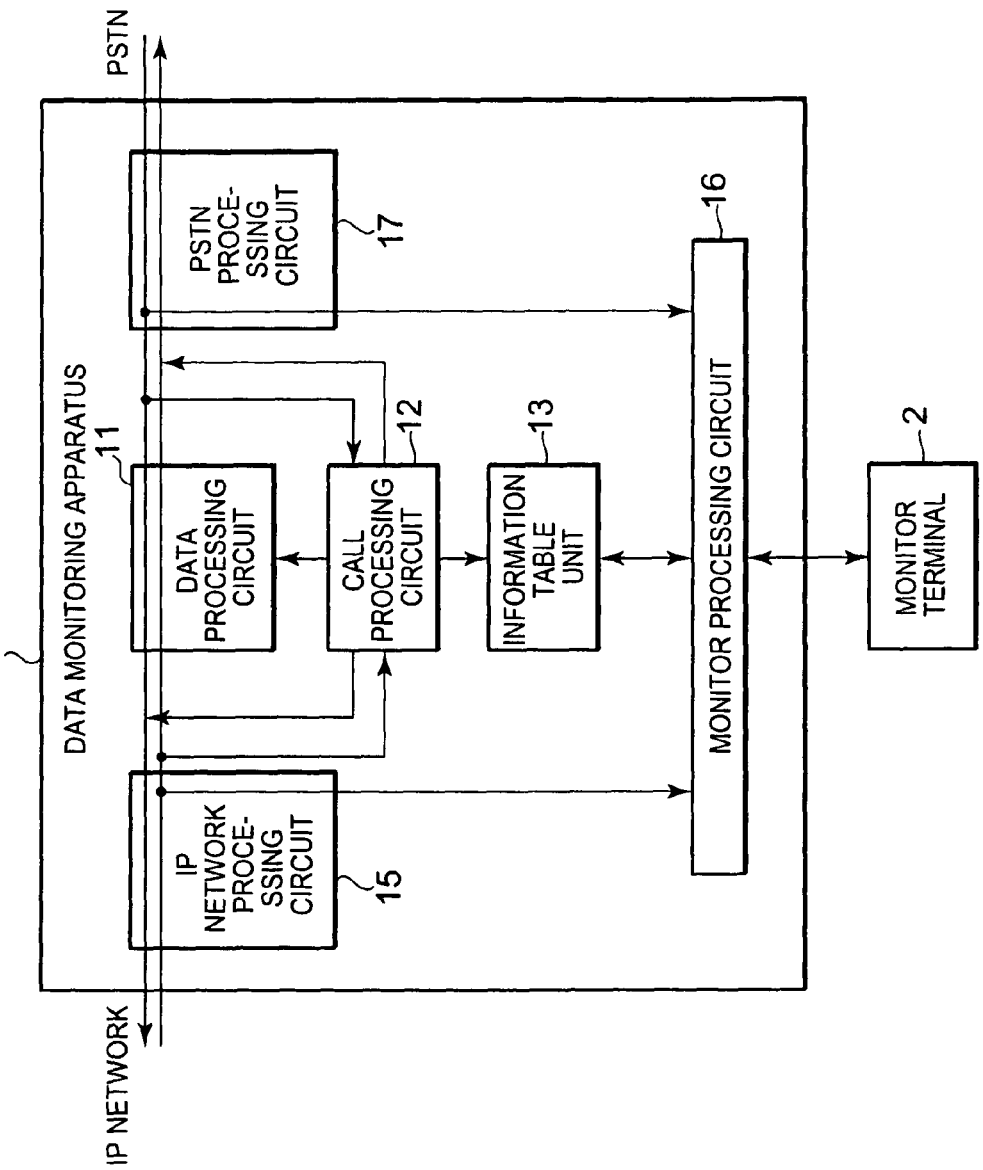

MULTIMEDIA DATA MONITORING SYSTEM AND MULTIMEDIA DATA MONITORING METHOD

This application is based upon and claims the benefit of priority from Japanese Patent Application No. 2006-132795 filed on May 11, 2006, the content of which are incorporated by reference.

BACKGROUND OF THE INVENTION

1. Field of the Invention

The present invention relates to the invention of a multimedia data monitoring system and a multimedia data monitoring method for monitoring multimedia data during communications in an interchange apparatus that connects multiple networks to provide for the communications such as TV telephone communication.

2. Description of the Related Art

An interchange apparatus which connects a public switched telephone network (hereinafter referred to as a PSTN) to an IP network (Internet protocol) enables the audio communications between a terminal connected to the PSTN and a terminal connected to the IP network. The related art of the interchange apparatus is disclosed in Japanese Patent Laid-open Application Publication No. 2005-348163. The related art refers to an audio monitoring device for monitoring the audio during communications.

Another related art is disclosed in Japanese Patent Laid-open Application Publication No. 2004-22200. The related art discloses an interchange apparatus for enabling TV telephone communications between a third generation mobile communication (hereinafter referred to as 3G-324M) terminal capable of television telephone communications (hereinafter referred to as TV telephone communications) supporting voice and video and a session initiation protocol (hereinafter referred to as a SIP) terminal. The interchange apparatus connects a network (for example, a 3G network) to which the 3G-324M terminal is connected to a network (for example, an IP network) to which the SIP terminal is connected.

It is relatively easy to monitor the multimedia data quality by monitoring the voice during communications. However, it is not easy to monitor, for example, the multimedia data quality of the TV telephone communication by monitoring audio or video during communications because, when multiplexed data obtained by multiplexing audio data with video data is communicated, the audio data and the video data cannot be demultiplexed unless multiplexing information is acquired, thereby failing to monitor audio or video. Although the multiplexed data can be demultiplexed into audio data and video data, the video data cannot be decoded unless the Config information can be acquired as parameter information required to decode the video data.

SUMMARY OF THE INVENTION

An exemplary object of the present invention is to provide a multimedia data monitoring system capable of monitoring multimedia data between plural networks including audio data or video data in real time.

An exemplary aspect of the invention is a data monitoring system including a data monitoring apparatus, a monitoring terminal, a first network, a second network, a first communication apparatus that is connected to the first network and a second communication apparatus that is connected to the second network, wherein the data monitoring apparatus includes a call processing circuit for retrieving decoding information from a call processing signal transmitted from one of the first communication apparatus and the second communication apparatus to the other and for transmitting the decoding information to the monitoring terminal, and a data processing circuit for transmitting data having voice data or image data to the monitoring terminal, wherein one of the first communication apparatus and the second communication apparatus transmits the data to the other, and wherein the monitoring terminal includes a decoding circuit for decoding the data in accordance with the decoding information.

According to the present invention, multimedia data between plural networks including audio data or video data can be monitored in real time.

BRIEF DESCRIPTION OF THE DRAWINGS

FIG. 3 is an explanatory view showing an example of the information held in an information table unit;

FIG. 6 is a system diagram illustrating a second exemplary embodiment of the data monitoring apparatus.

DETAILED DESCRIPTION OF THE PREFERRED EMBODIMENTS

1. First Exemplary Embodiment

Figure 1:
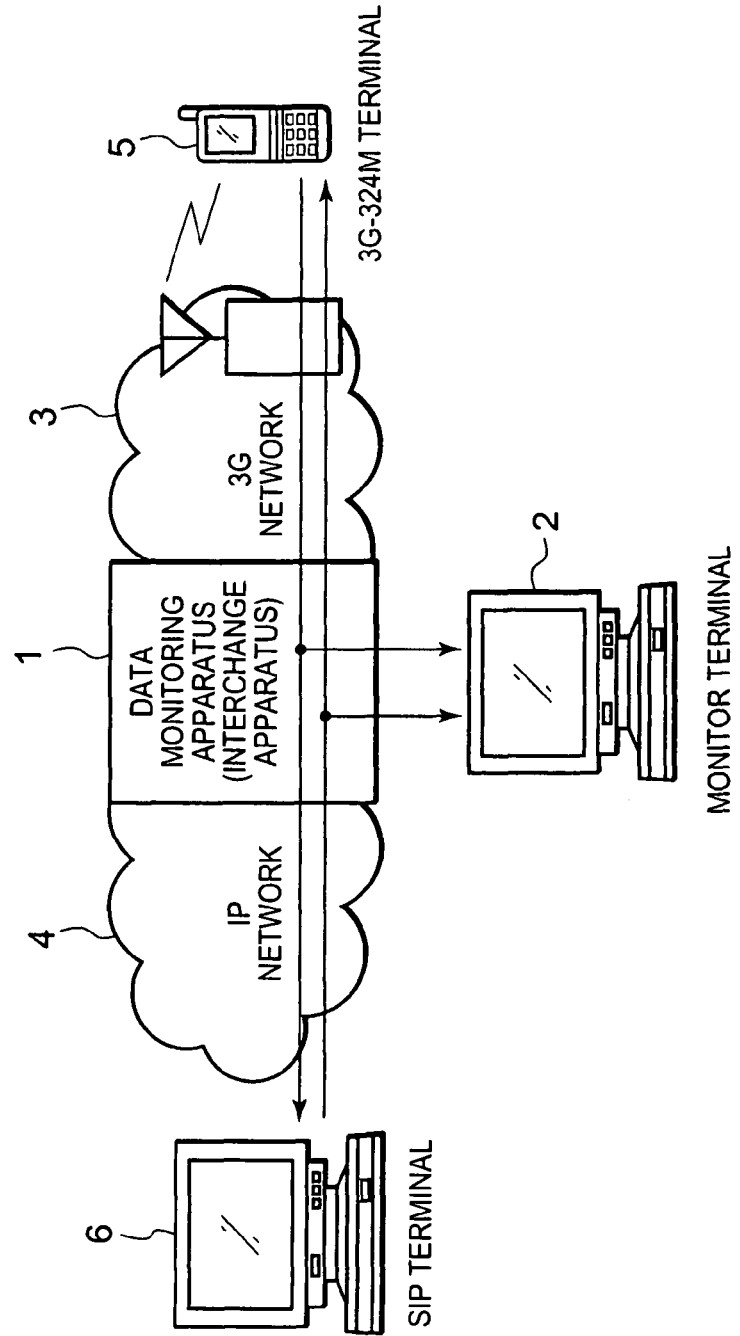
FIG. 1 is a system diagram illustrating an example of the communication system to which a multimedia data monitoring system is applied.

The first exemplary embodiment according to the present invention is described below by referring to FIG. 1. FIG. 1 is a system diagram illustrating an example of the communication system to which a multimedia data monitoring system according to the present invention is applied. The communication system includes a data monitoring apparatus 1 for connecting multiple networks, a monitor terminal 2 for decoding and outputting multimedia data, a 3G network 3, an IP network 4, a 3G-324M terminal 5 connected to the 3G network 3, and a SIP terminal 6 connected to the IP network 4. In the embodiments, an IP network and a 3G network are used as exemplary heterogeneous networks.

The data monitoring apparatus 1 functions as an interchange apparatus for connecting the 3G network 3 to the IP network 4 to realize the TV telephone communication performed by the 3G-324M terminal 5 and the SIP terminal 6. The data monitoring apparatus 1 also determines the multiplexing information (the multiplexing information can also referred to as multiplexing table information) about multimedia data and the Config information about video and transfers them to the monitor terminal 2 when the communication protocol of a call processing signal is converted. The multiplexing information about the multimedia data and the Config information about video are information required to decode multimedia data.

Figure 2:
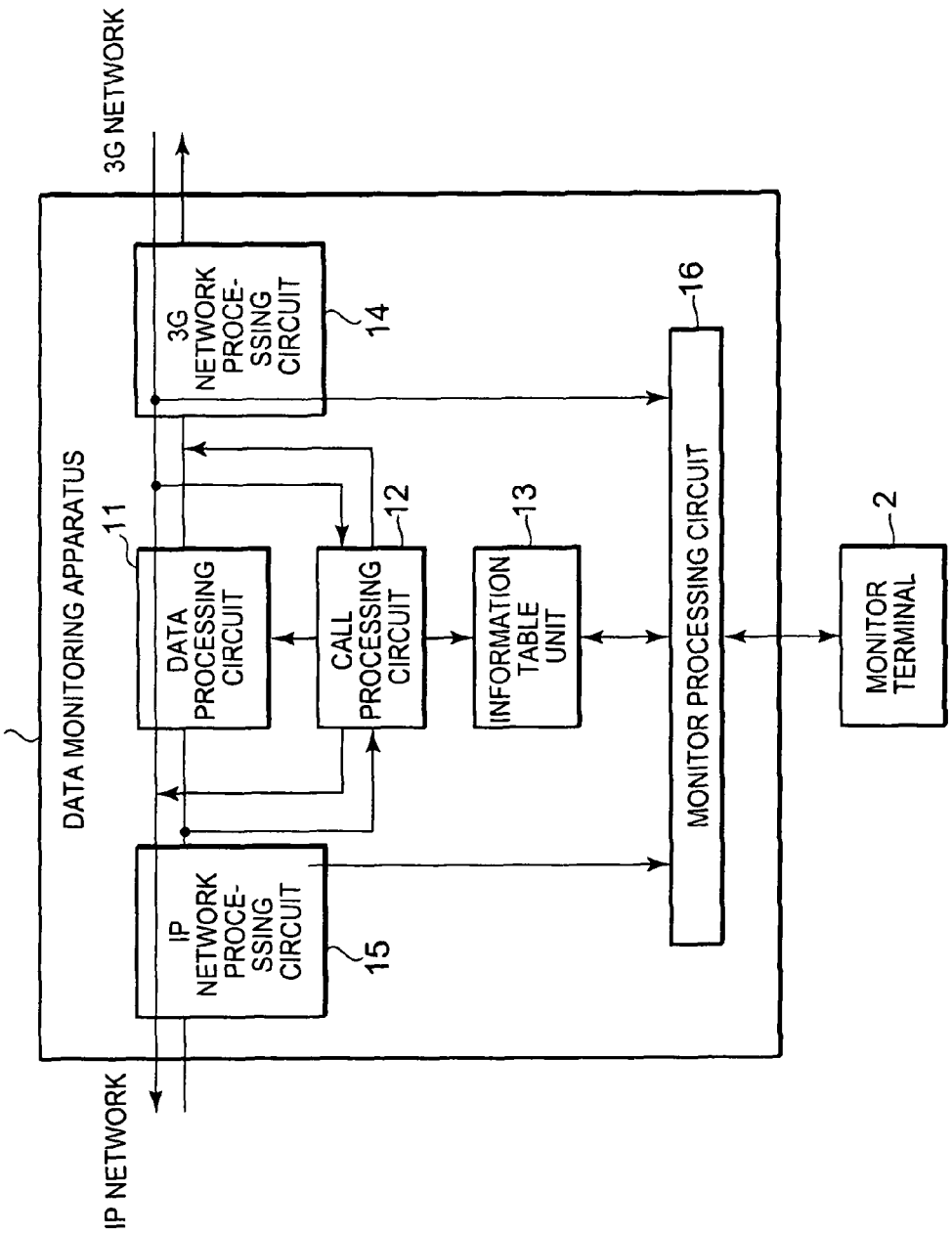
FIG. 2 is a system diagram illustrating a first exemplary embodiment of the data monitoring apparatus.

FIG. 2 is a diagram illustrating an example of the data monitoring apparatus 1 according to the present exemplary embodiment. As shown in FIG. 2, the data monitoring apparatus 1 includes a data processing circuit 11, a call processing circuit 12, an information table unit 13, a 3G network processing circuit 14, an IP network processing circuit 15, and a monitor processing circuit 16.

The 3G network processing circuit 14 terminates the data received from the 3G network 3. Practically, for example, the 3G network processing circuit 14 performs a process of extracting multimedia data from the received data. Then, if the data received from the 3G network 3 is a call processing signal, the 3G network processing circuit 14 passes the data to the call processing circuit 12. When the received data is multimedia data, it passes the data to the data processing circuit 11.

The call processing circuit 12 converts the communication protocol of the call processing signal received from one terminal of the 3G-324M terminal 5 or SIP terminal 6. For example, the call processing circuit 12 converts the call processing signal received from the 3G network processing circuit 14 into a signal on the basis of the SIP protocol as a call processing signal of the SIP terminal 6, and outputs the result to the IP network processing circuit 15. For example, when the communication protocol of an input call processing signal is converted, the call processing circuit 12 extracts the multiplexing information about multimedia data or the Config information about video from the call processing signal. Then, it transmits the extracted multiplexing information or Config information to the information table unit 13 or the data processing circuit 11. Practically, for example, it transmits the multiplexing information about the multimedia data or Config information about video determined by the negotiation on the basis of the H. 245 to the information table unit 13 or the data processing circuit 11.

The data processing circuit 11 converts the format of the multimedia data input from the 3G network processing circuit 14 or the IP network processing circuit 15 on the basis of the multiplexing information or the Config information transmitted from the call processing circuit 12. Then, the data processing circuit 11 outputs the format-converted multimedia data to the 3G network processing circuit 14 or the IP network processing circuit 15.

For example, the IP network processing circuit 15 converts a SIP protocol signal input from the call processing circuit 12 for the UDP/IP, and transmits the result to the IP network 4. Furthermore, for example, the IP network processing circuit 15 converts the multimedia data input from the data processing circuit 11 for the RTP/UDP/IP, and transmits the result to the IP network 4. Additionally, the IP network processing circuit 15 terminates the data received from the IP network 4. When the data received from the IP network 4 is a call processing signal, the IP network processing circuit 15 outputs data to the call processing circuit 12. When the IP network processing circuit 15 receives audio or video data, it outputs the data to the data processing circuit 11.

The call processing circuit 12 converts the call processing signal input from the IP network processing circuit 15 into a signal on the basis of the H. 245 protocol as a call processing signal of the 3G-324M terminal 5, and outputs the result to the 3G network processing circuit 14. When the call processing circuit 12 converts the communication protocol of the call processing signal, it extracts the Config information about the video of the SIP terminal 6 from the SIP protocol signal as a call processing signal of the SIP terminal 6. Then, the call processing circuit 12 transmits the Config information to the information table unit 13 and the data processing circuit 11.

The data processing circuit 11 converts the format of the audio or video data input from the IP network processing circuit 15 into the data format of the 3G network 3 on the basis of the Config information about the video transmitted from the call processing circuit 12. Then, the data processing circuit 11 outputs the format-converted audio or video data to the 3G network processing circuit 14.

The 3G network processing circuit 14 multiplexes, for example, an H. 245 protocol signal received from the call processing circuit 12 into the H. 223, and transmits the result to the 3G network 3. The 3G network processing circuit 14 multiplexes, for example, the audio or video data received from the data processing circuit 11 into the H. 223, and transmits the result to the 3G network 3.

When call connection control of the TV telephone communication between the 3G-324M terminal 5 and the SIP terminal 6 is completed, the call processing circuit 12 transmits a signal as a request to transmit an intra-frame in a predetermined time period to the 3G-324M terminal 5 and the SIP terminal 6. The "intra-frame" refers to a frame for which a compressing process is performed using only the information in the same frame independent of the preceding and subsequent frames in multiple sequentially arranged images (hereinafter referred to as frames). The 3G-324M terminal 5 and the SIP terminal 6 transmit an intra-frame when a request to transmit an intra-frame is issued from the call processing circuit 12. In the above-mentioned embodiment, the call processing circuit 12 has the configuration in which a signal of a request to transmit an intra-frame in a predetermined time period is issued, but it is not necessary that a signal of a request to transmit an intra-frame is to be issued in a predetermined time period, but it can be issued intermittently.

When the monitor processing circuit 16 receives a communication status confirmation instruction signal from the monitor terminal 2, it confirms the information held by the information table unit 13. Then, it transmits the data obtained by copying the channel number during the TV telephone communication to the monitor terminal 2. Furthermore, when the monitor processing circuit 16 receives the designation of the channel of a monitor object from the monitor terminal 2, it copies the multiplexing table information or the Config information about the designated channel in the information held by the information table unit 13, and transmits the copied information to the monitor terminal 2. Then, the monitor processing circuit 16 copies the multimedia data received from the 3G network 3 from the 3G network processing circuit 14, or the multimedia data received from the IP network 4 from the IP network processing circuit 15, and transfers the copied data to the monitor terminal 2. That is, it starts the process of transferring to the monitor terminal 2 the multimedia data from the 3G network 3 to the IP network 4 or the multimedia data from the IP network 4 to the 3G network 3.

FIG. 3 is an explanatory view showing an example of the information held in the information table unit 13. As shown in FIG. 3, the information table unit 13 stores the multiplexing information or the Config information for each communication terminal after associating the information with a channel number during the communications. Then, the information table unit 13 continues storing the information such as the multiplexing information, the Config information, during the call connection. In FIG. 3, "LCN:0 . . . " indicates an example of the contents of the multiplexing information, and "000001B0080 . . . " indicates an example of the contents of the Config information.

The monitor terminal 2 can demultiplexes multimedia data into video data and audio data according to the multiplexing information about the received multimedia data. Then, the monitor terminal 2 can decode the video data from the Config information about video, and outputs the result. Thus, the monitor terminal 2 can perform multimedia data monitor (retrieve audio data or video data, or audio data and video data from the multimedia data received from the monitor processing circuit 16, and output audio or video, or audio and video on the basis of the retrieved data) in real time. Furthermore, the monitor terminal 2 decodes an intra-frame received from the 3G-324M terminal 5 and the SIP terminal 6 in a predetermined time period. Therefore, the monitor terminal 2 can output clear videos in a predetermined time period. In addition, the monitor terminal 2 can transmit a communication status confirmation instruction signal to the data monitoring apparatus 1 to confirm whether or not there is a call during the TV telephone communication. If TV telephone communications have been started when the monitor terminal 2 transmits an instruction signal to the data monitoring apparatus 1, the monitor terminal 2 can output a clear video upon receipt of an intra-frame, and the monitoring process can be started on the multimedia data.

The 3G network 3 and the IP network 4 are communication networks using different communication protocols. When data is communicated between the 3G network 3 and the IP network 4, the data monitoring apparatus 1 converts the communication protocol of multimedia data, and format-converts multimedia data.

Figure 4:
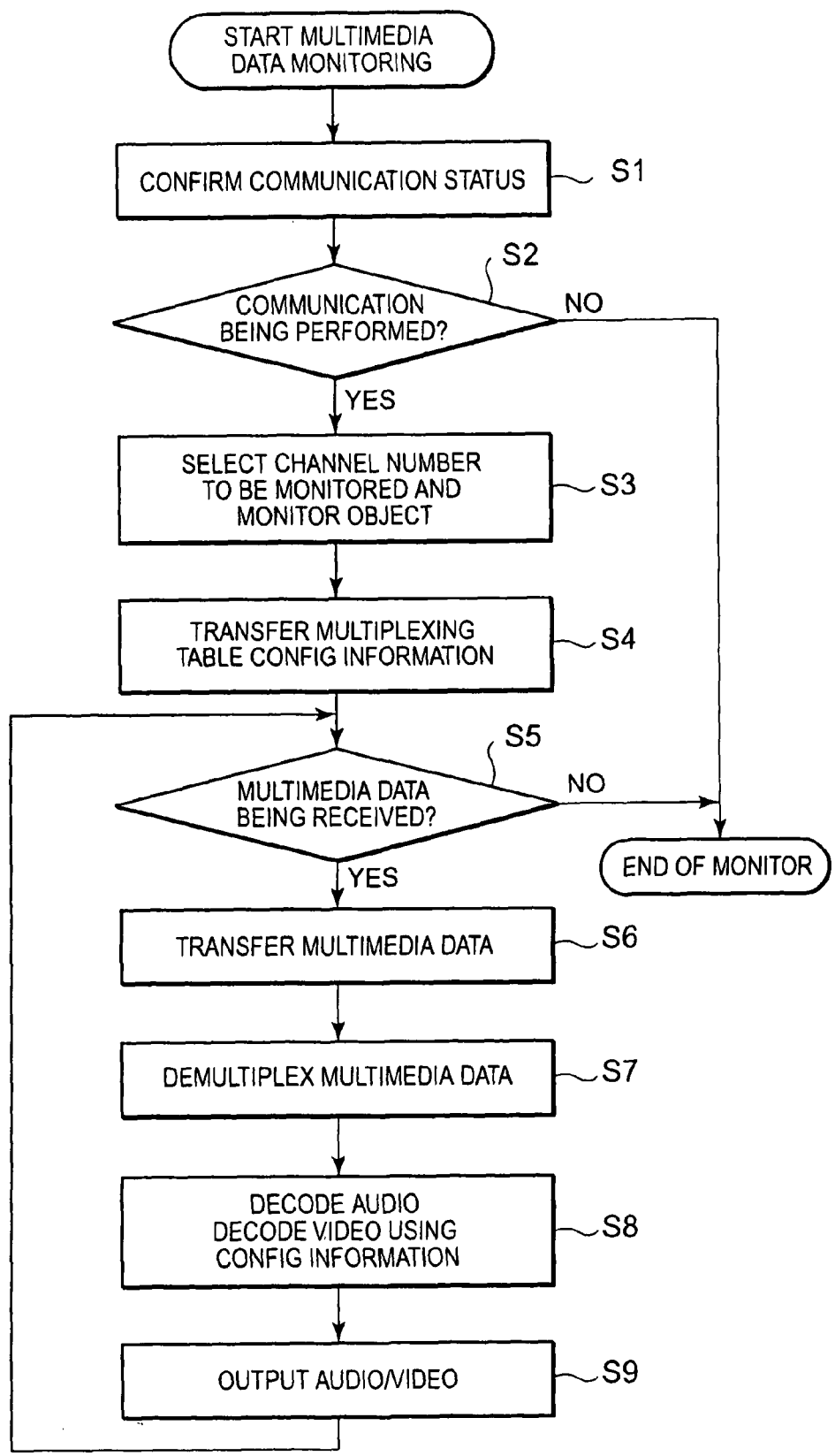
FIG. 4 is a flowchart showing the operation of the data monitoring apparatus and a monitor terminal.

Described below are the operations of the data monitoring apparatus 1 and the monitor terminal 2 in the present exemplary embodiment. FIG. 4 is a flowchart of the operations of the data monitoring apparatus 1 and the monitor terminal 2 according to the present exemplary embodiment.

The monitor terminal 2 transmits a communication status confirmation instruction signal to the monitor processing circuit 16 to inquire whether or not there is a call during TV telephone communications (step S1). Upon receipt of the communication status confirmation instruction signal, the monitor processing circuit 16 confirms the information held by the information table unit 13. Then, the monitor processing circuit 16 copies the channel number in TV telephone communications, and transmits the copied number to the monitor terminal 2 (step S2). When there is no channel in the TV telephone communication, the monitor terminal 2 terminates the multimedia data monitor.

When there is a channel in the TV telephone communications, a user selects the channel number to be monitored and a monitor object (for example, of the 3G-324M terminal 5 or the SIP terminal 6) from among the channels in the TV telephone communications (step S3). The monitor terminal 2 transmits to the monitor processing circuit 16 the information indicating the selected monitor object and the channel number as an instruction signal. The information indicating the monitor object refers to the multimedia data received from the 3G-324M terminal 5, or the multimedia data received from the SIP terminal 6.

Upon receipt of the information designating the channel number, the monitor processing circuit 16 copies the multiplexing information or the Config information about the channel number monitored from the information table unit 13, and transmits the copied information to the monitor terminal 2 (step S4). If the information indicating the monitor object refers to the 3G-324M terminal 5, the monitor processing circuit 16 confirms whether or not the multimedia data of the channel number of a monitor object in the multimedia data received from the 3G network 3 is being received. If the information indicating a monitor object refers to the SIP terminal 6, the monitor processing circuit 16 confirms whether or not the multimedia data of the channel number to be monitored in the multimedia data received from the IP network 4 is being received (step S5). When a call is disconnected, the call processing circuit 12 deletes the information about the channel of a monitor object stored in the information table unit 13. Furthermore, the information table unit 13 notifies the monitor processing circuit 16 that the call of the channel of a monitor object has been disconnected. Thus, it is confirmed that the user does not receive multimedia data.

If no multimedia data is received on the specified channel, the monitor processing circuit 16 notifies the monitor terminal 2 that multimedia data has not been received. If the monitor terminal 2 is notified that no multimedia data has been received, it terminates the multimedia data monitor.

If multimedia data is being received on the specified channel, the monitor processing circuit 16 copies the multimedia data and transmits it to the monitor terminal 2 (step S6). If the monitor object is in the 3G-324M terminal 5, the monitor processing circuit 16 copies the multimedia data from the 3G network processing circuit 14, and transfers the copied data to the monitor terminal 2. If the monitor object is in the SIP terminal 6, the monitor processing circuit 16 copies the multimedia data from the IP network processing circuit 15, and transfers the copied data to the monitor terminal 2.

If the monitor object is in the 3G-324M terminal 5, the monitor terminal 2 receives the multimedia data, and demultiplexes the multimedia data into audio data and video data according to the already obtained multiplexing information (step S7). Then, the monitor terminal 2 decodes the audio data. Furthermore, the monitor terminal 2 decodes video data according to the already obtained Config information (step S8). The monitor terminal 2 outputs audio on the basis of the decoded audio data, or video on the basis of the video data (step S9). The user can monitor whether or not there is no problem with the multimedia data from the output audio and video. The information table unit 13 does not store the multiplexing information about the multimedia data relating to the IP network 4. Therefore, when the SIP terminal 6 includes a monitor object, it is not necessary to perform the process in step S7.

The monitor processing circuit 16 copies the multimedia data from the 3G network processing circuit 14 or the IP network processing circuit 15 and continues transmitting the data until no multimedia data is received on the specified channel. Thus, the monitor terminal 2 can continue monitoring the multimedia data in real time. When no multimedia data is received on the specified channel, the monitor processing circuit 16 notifies the monitor terminal 2 that multimedia data is not received. When the monitor terminal 2 is notified that multimedia data is not received, it terminates the multimedia data monitor.

In this exemplary embodiment, if the multimedia data quality is degraded by the process of monitoring multimedia data in the TV telephone communication, then a suspected portion of the degradation of multimedia data can be segmented. For example, if video data being monitored is disturbed when a monitor object is in the 3G-324M terminal 5, it is considered that there is a possibility that anywhere from the 3G-324M terminal 5 to the 3G network processing circuit 14 includes a factor of disturbing the video data, and a suspected portion can be segmented. If the monitor object is in the SIP terminal 6, and the video data being monitored is disturbed, then it is considered that there is a possibility that anywhere from the SIP terminal 6 to the IP network processing circuit 15 includes a factor of disturbing the video data, and a suspected portion can be segmented.

In the present exemplary embodiment, both audio and video are monitored. However, a suspected portion of multimedia data degradation can be segmented by monitoring only one of them.

2. Second Exemplary Embodiment

Figure 5:
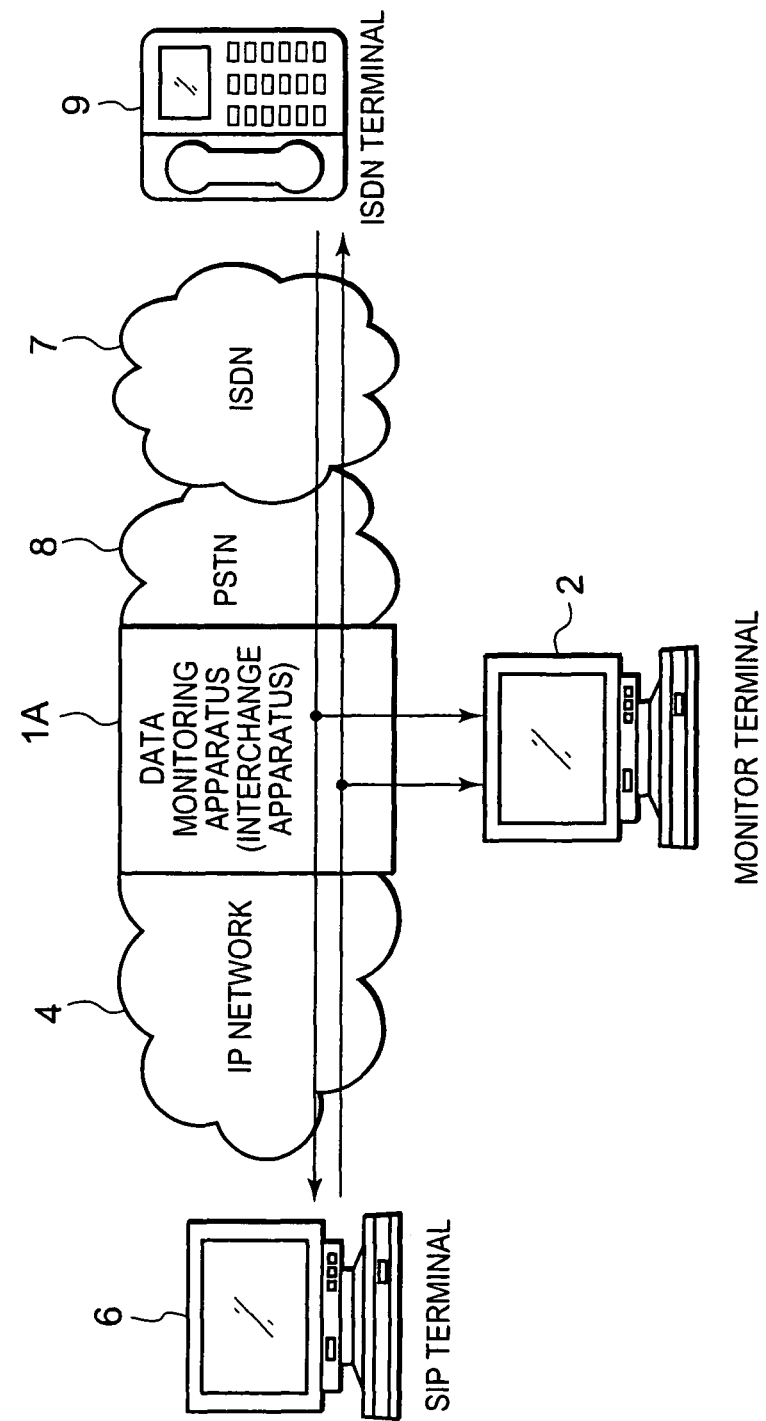
FIG. 5 is a system diagram illustrating another example of the communication system to which a multimedia data monitoring system is applied.

Next, the second exemplary embodiment of the present invention is described by referring to FIG. 5. FIG. 5 is a system diagram illustrating another example of the communication system to which a multimedia data monitoring system is applied. The second exemplary embodiment is different from the first exemplary embodiment in that, for example, the an ISDN (Integrated Services Digital Network) 7 and PSTN 8 replace the 3G network 3, an ISDN terminal 9 replaces the 3G-324M terminal 5, and a data monitoring apparatus 1A replaces the data monitoring apparatus 1. The configuration and the operations of the monitor terminal 2, the IP network 4, and the SIP terminal 6 are the same as the configuration and the operations of the monitor terminal 2, the IP network 4, and the SIP terminal 6 according to the first exemplary embodiment.

In FIG. 5, the ISDN terminal 9 can perform TV telephone communications. The data monitoring apparatus 1A connects the PSTN 8 to the IP network 4 to enable the TV telephone communication between the ISDN terminal 9 and the SIP terminal 6 by way of the ISDN 7.

FIG. 6 is a system diagram illustrating a second exemplary embodiment of the data monitoring apparatus 1A. The second exemplary embodiment is different from the first exemplary embodiment in that a PSTN processing circuit 17 replaces the 3G network processing circuit 14 shown in FIG. 2. The configuration and the operations of the data processing circuit 11, the call processing circuit 12, the information table unit 13, the IP network processing circuit 15, and the monitor processing circuit 16 are the same as the configuration and the operations of the data processing circuit 11, the call processing circuit 12, the information table unit 13, the IP network processing circuit 15, and the monitor processing circuit 16 according to the first exemplary embodiment.

The PSTN processing circuit 17 terminates the data received from the PSTN 8. Practically, the PSTN processing circuit 17 performs processes such as a process of extracting multimedia data from received data. Additionally, the PSTN processing circuit 17 passes data to the call processing circuit 12 when the data received from the PSTN 8 is a call processing signal. When the received data is multimedia data, it passes the data to the data processing circuit 11. Furthermore, the PSTN processing circuit 17 multiplexes, for example, the H. 245 protocol signal input from the call processing circuit 12 into the H. 223, and transmits the result to the PSTN 8. The PSTN processing circuit 17 also multiplexes the audio or video data input from the data processing circuit 11 into the H. 223, and transmits the result to the PSTN 8.

Described next is the operations according to the second exemplary embodiment of the present invention. As compared with the operations according to the first exemplary embodiment, the operations according to the second exemplary embodiment includes the ISDN terminal 9 replacing the 3G-324M terminal 5, the ISDN 7 and the PSTN 8 replacing the 3G network 3, and the PSTN processing circuit 17 replacing the 3G network processing circuit 14.

In this exemplary embodiment, a suspected portion of degraded multimedia data quality can be segmented when the multimedia data degradation occurs by the process of monitoring the multimedia data being used in the TV telephone communications. In the second exemplary embodiment, both audio and video are monitored, but one of them can be monitored with a suspected portion of multimedia data degradation correctly segmented.

In the first exemplary embodiment, the 3G network 3 and the IP network 4 are exemplified as different networks while, in the second exemplary embodiment, the ISDN 7 and PSTN, and the IP network are exemplified as different networks. However, the different networks are not limited to these types. That is, the present invention can be applied to the multimedia data monitoring system capable of performing communications such as TV telephone communications using other types of networks. For example, the present invention can also be applied to a multimedia data monitoring system capable of performing TV telephone communications by connecting the ISDN with the IP network, the ISDN with a network of an Internet service provider (ISP), or the 3G network with the ISP network. Furthermore, the portions recognized as different networks can be realized by the same types of networks.

Although multimedia data is described above, the present invention can also be applied to only audio data etc.

The previous description of these embodiments is provided to enable a person skilled in the art to make and use the present invention. Moreover, various modifications to the embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

What is claimed is:

1. A data monitoring system for monitoring data including at least one of voice data and image data, said data monitoring system comprising:

a first network, to which a first communication apparatus is connected;

a second network, to which a second communication apparatus is connected, and uses a communication protocol different from a communication protocol used by said first network; and a data monitoring apparatus, to which a monitoring terminal is connected, including:

a call processing circuit to retrieve decoding information, required for decoding said data, from a call processing signal transmitted from said first communication apparatus to said second communication apparatus and from said second communication apparatus to said first communication apparatus, and to transmit said decoding information to said monitoring terminal; and a data processing circuit to convert a format of data, transmitted from said first communication apparatus, into a format of said second communication apparatus, or to convert a format of data transmitted from said second communication apparatus into a format of said first communication apparatus, on a basis of said decoding information, wherein data from at least one of said first communication apparatus and said second communication apparatus, a format of said data from at least one of said first communication apparatus and said second communication apparatus has not been converted, is copied and transferred to said monitoring terminal, which includes a decoding circuit to decode said data in accordance with said decoding information, wherein if, during monitoring, degradation of the quality of the data is detected, the degraded portion of the data is sliced out, and wherein said data monitoring apparatus is arranged on a transmission path of said voice data or said image data between said first network and said second network.

2. The data monitoring system according to claim 1, wherein said data monitoring apparatus further comprises:

a network processing circuit to connect said first network with said second network, and wherein said first network comprises a different network from said second network.

3. The data monitoring system according to claim 2, wherein the network processing circuit is adapted to extract a multimedia data from said data transmitted from at least one of said first communication apparatus and said second communication apparatus.

4. The data monitoring system according to claim 1, wherein said call processing circuit requests at least one of said first communication apparatus and said second communication apparatus to transmit an intra-frame at a predetermined time period.

5. The data monitoring system according to claim 1, wherein said monitoring terminal further includes an instruction circuit to instruct a communication specified to be monitored to said data monitoring apparatus,
wherein said call processing circuit transmits said decoding information in accordance with said instruction to said monitoring terminal, and
wherein said data processing circuit transmits said data in accordance with said instruction to said monitoring terminal.

6. The data monitoring system according to claim 1, wherein one of said communication apparatus and said second communication apparatus is connected to said 3G network and another one of said communication apparatus and said second communication apparatus is connected to said IP network which is not said 3G network.

7. The data monitoring system according to claim 1, wherein the call processing circuit is adapted to convert a communication protocol of the call processing signal transmitted from one of said first communication apparatus and said second communication apparatus.

8. The data monitoring system according to claim 7, wherein the data monitoring apparatus further comprises an information table unit, and
wherein, if the call processing circuit converts the communication protocol of the call processing signal transmitted from one of said first communication apparatus and said second communication apparatus, the call processing circuit extracts the decoding information, and the call processing circuit transmits Config information which is included in the decoding information and includes information required to decode multimedia data to the information table unit and to the data processing circuit.

9. The data monitoring system according to claim 1, wherein the data monitoring apparatus further comprises a first network processing circuit connected to the first network, and a second network processing circuit connected to the second network.

10. The data monitoring system according to claim 9, wherein the first network processing circuit and the second network processing circuit are connected to the call processing circuit and the data processing circuit.

11. The data monitoring system according to claim 9, wherein the data processing circuit is adapted to convert a format of a multimedia data input from at least one of the first network processing circuit and the second network processing circuit based on the decoding information transmitted from the call processing circuit, and to output a format-converted multimedia data to another one of the first network processing circuit and the second network processing circuit.

12. The data monitoring system according to claim 1, wherein the data monitoring apparatus further comprises a monitor processing circuit, wherein the monitor processing circuit is connected to a first network processing circuit, a second network processing circuit, and an information table unit within the data monitoring apparatus.

13. The data monitoring system according to claim 12, wherein the monitor processing circuit is adapted to confirm an information held by the information table unit, if the monitor processing circuit receives a communication status confirmation instruction signal from the monitor terminal.

14. The data monitoring system according to claim 12, wherein the monitor processing circuit is adapted to copy a multiplexing table information held by the information table unit, and to transmit the copied multiplexing table information to the monitor terminal, if the monitor processing circuit receives a designation of a channel of a monitor object from the monitor terminal.

15. A data monitoring apparatus for monitoring data including at least one of voice data and image data, transmitted between a first network and a second network, said data monitoring apparatus comprising:
a call processing circuit to retrieve decoding information, required for decoding said data, from a call processing signal transmitted from said first network to said second network and from a first communication apparatus to a second communication apparatus, and to transmit said decoding information to a monitoring terminal, said second network using a communication protocol different from a communication protocol used by said first network; and
a data processing circuit to convert a format of data, transmitted from said first network, into a format of said second network, or to convert a format of data transmitted from said second network into a format of said first network, on a basis of said decoding information,
wherein data from at least one of said first communication apparatus and said second communication apparatus, a format of said data from at least one of said first communication apparatus and said second communication apparatus has not been converted, is copied and transferred to said monitoring terminal, wherein if, during monitoring, degradation of the quality of the data is detected, the degraded portion of the data is sliced out, and
wherein said data monitoring apparatus is arranged on a transmission path of said voice data or said image data between said first network and said second network.

16. The data monitoring apparatus, according to claim 15, further comprising:
a network processing circuit to connect said first network with said second network, said first network being a different network from said second network,
wherein said data and said decoding information are specified in accordance with a communication instructed by said monitoring terminal.

17. A method used in a data monitoring system for monitoring data including at least one of voice data and image data, including a data monitoring apparatus, a monitoring terminal connected to said data monitoring apparatus, a first network, and a second network, said method comprising:
retrieving decoding information, required for decoding said data, from a call processing signal transmitted from said first network to said second network and from a first communication apparatus to a second communication apparatus, said second network using a communication protocol different from a communication protocol used by said first network;
transmitting said decoding information to said monitoring terminal;
converting a format of data, transmitted from said first network, into a format of said second network, or converting a format of data transmitted from said second network into a format of said first network, on a basis of said decoding information;

copying data from at least one of said first communication apparatus and said second communication apparatus, a format of said data from at least one of said first communication apparatus and said second communication apparatus has not been converted, and transferring said data to said monitoring terminal; and decoding said data in accordance with said decoding information, wherein if, during monitoring, degradation of the quality of the data is detected, the degraded portion of the data is sliced out, wherein said data monitoring apparatus is arranged on a transmission path of said voice data or said image data between said first network and said second network.

18. The method of claim 17, wherein said retrieving comprises copying the decoding information from an information table unit, and transmitting the copied decoding information to the monitoring terminal.

19. The method of claim 17, wherein said transferring said data to said monitoring terminal is performed if said data including said at least one of voice data and image data are confirmed to be received on a specified channel.

20. A data monitoring system for monitoring data including at least one of voice data and image data, said system comprising:

a first network, to which a first communication apparatus is connected;

a second network, to which a second communication apparatus is connected, said second network using a communication protocol different from a communication protocol used by said first network; and a data monitoring apparatus, to which a monitoring terminal is connected, including:

call processing means for retrieving decoding information, required for decoding said data, from a call processing signal transmitted from said first communication apparatus to said second communication apparatus and from said second communication apparatus to said first communication apparatus, and for transmitting said decoding information to said monitoring terminal; and data processing means for converting a format of data, transmitted from said first communication apparatus, into a format of said second communication apparatus, or for converting a format of data transmitted from said second communication apparatus into a format of said first communication apparatus, on a basis of said decoding information, wherein data from at least one of said first communication apparatus and said second communication apparatus, a format of said data from at least one of said first communication apparatus and said second communication apparatus has not been converted, is copied and transferred to said monitoring terminal, which includes decoding means for decoding said data in accordance with said decoding information, wherein if, during monitoring, degradation of the quality of the data is detected, the degraded portion of the data is sliced out, and wherein said data monitoring apparatus is arranged on a transmission path of said voice data or said image data between said first network and said second network.

* * * * *